United States Patent [19]

Mizote et al.

[11] 4,250,402
[45] Feb. 10, 1981

[54] ELECTRONIC TRIP METER FOR A MOTOR VEHICLE

[75] Inventors: Masanori Mizote, Yokosuka; Kiyoshi Yamaki, Yokohama; Takashi Oka, Tokyo; Hideoki Matsuoka, Yokohama; Hiroyuki Nomura, Yokohama; Takaaki Mogi, Yokohama, all of Japan

[73] Assignee: Nissan Motor Company, Limited, Yokohama, Japan

[21] Appl. No.: 968,982

[22] Filed: Dec. 13, 1978

[30] Foreign Application Priority Data

Dec. 23, 1977 [JP] Japan .............................. 52-156053

[51] Int. Cl.³ ...................... G06M 3/14; G06F 15/20
[52] U.S. Cl. ........................ 235/92 DN; 235/92 PL; 235/92 PE; 235/92 EV
[58] Field of Search ........ 235/92 DN, 92 EV, 92 PL, 235/92 PE, 95 R, 97; 364/424, 460, 561

[56] References Cited

U.S. PATENT DOCUMENTS

| | | | |
|---|---|---|---|
| 4,053,749 | 10/1977 | Shinoda et al. | 235/92 DN |
| 4,068,307 | 1/1978 | Floyd et al. | 235/92 DN |
| 4,071,892 | 1/1978 | Genzling | 235/92 DN |
| 4,103,332 | 7/1978 | Floyd et al. | 235/92 DN |
| 4,145,605 | 3/1979 | Marcus | 235/92 DN |

*Primary Examiner*—Joseph M. Thesz

[57] ABSTRACT

An electronic trip meter for a motor vehicle comprises an up-down counter, a memory circuit, display circuit, and other auxiliary circuits. The up-down counter produces an output signal indicative of a distance travelled by the vehicle by counting a number of pulses generated each time the vehicle travels a predetermined distance or a distance remaining to an objective point of a predetermined course by subtracting the travelled distance from a preset distance. The counting up and down functions of the up-down counter is manually controlled for compensating for a travelled distance along a wrong course. The output of the up-down counter is fed to the display circuit for displaying a distance indicated by the output signal thereof. A plurality of distances of legs of a predetermined course may be stored in the memory circuit so that each distance is fed to the up-down counter as the predetermined distance.

16 Claims, 5 Drawing Figures

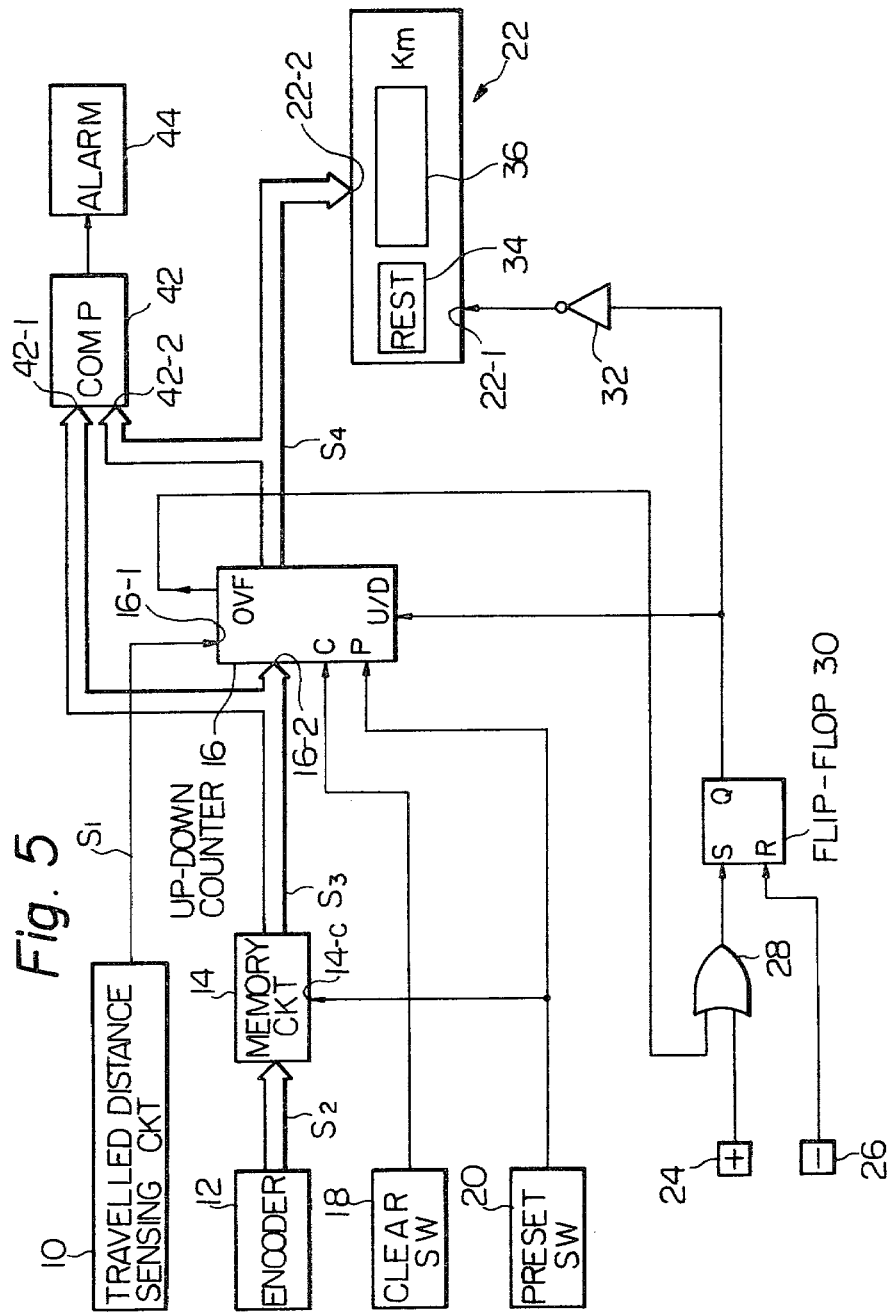

ELECTRONIC TRIP METER FOR A MOTOR VEHICLE

FIELD OF THE INVENTION

The present invention generally relates to a trip meter for a motor vehicle. More particularly, the present invention relates to an electronic trip meter.

BACKGROUND OF THE INVENTION

Generally conventional type of trip meters are of the mechanical type. In such trip meters a mechanical counter including a numeral display device is driven via reduction gears by a drive shaft operatively connected to the transmission or other mechanism of the vehicle. When the driver of the vehicle intends to measure a distance between two points he will drive between, the driver resets the trip meter to zero so that the trip meter will count over the distance travelled, from zero. The trip meter is used not only for merely measuring the travelled distance but also for estimating the remaining distance to a goal or an objective point when the driver is aware of the distance between the two points, i.e. the starting point and the objective point. In order to ascertain the remaining distance on the way to the objective point the driver, however, must subtract the actually travelled distance which is displayed from the known distance by mental calculation.

For eliminating the inconvenience of such mental calculations, a trip meter which displays the remaining distance is desirable. Such a trip meter can be easily imagined since it is possible to ascertain the remaining distance by reducing a preset distance (numerals) in an opposite manner thereby subtracting the actually travelled distance from a preset distance. Although this type of a trip meter is convenient while the actually travelled distance does not exceed the preset distance, it is troublesome for the driver to ascertain the actual distance travelled if the distance exceeds the distance preset in the meter since he must add the distance corresponding to the excess to the preset distance. Moreover, if the preset distance is radically different from the actually travelled distance, the vehicle driver may not be able to determine if the displayed distance indicates the remaining distance or the excess of the distance. Therefore, such a trip meter which displays only the remaining distance can not satisfy all of the present day drivers needs.

Further with either such a trip meter or the conventional trip meter a distance displayed either in the form of actually travelled one or the remaining one, does not represent a distance along a predetermined course if the vehicle has taken a wrong course. Assuming the vehicle takes a wrong course from a point along the predetermined course and returns to the point after the vehicle driver notices that he was on a wrong course, the distance along the wrong course is added to the distance displayed as the one travelled Therefore, the distance displayed does not correspond to the distance of the predetermined course. In order to ascertain only the distance along the predetermined course the vehicle driver has to subtract the distance travelled along the wrong course from the displayed distance.

SUMMARY OF THE INVENTION

The present invention has been developed in order to overcome the above mentioned drawbacks of the conventional trip meters.

According to the present invention there is provided an electronic trip meter which comprises an up-down counter, a memory circuit, a display circuit and other circuits such as a travelled distance sensing circuit and logic gates. The up-down counter produces an output signal indicative of a distance travelled by the vehicle by counting a number of pulses applied from the travelled distance sensing circuit or a distance remaining to an objective point or a goal of a predetermined course by subtracting the number of pulses of the same from a value corresponding to a preset distance. The counting up and down functions of the up-down counter is manually controlled for compensating for a distance along a wrong course. The display circuit is arranged to display numerals corresponding to either a travelled distance or a remaining distance and to display a sign which indicates that the numerals indicate a remaining distance when a remaining distance is displayed.

It is therefore, an object of the present invention to provide an electronic trip meter for a motor vehicle, in which a travelled distance or a remaining distance is accurately displayed.

Another object of the present invention is to provide such a trip meter in which a distance travelled along a wrong course is compensated for.

Further object of the present invention is to provide such a trip meter in which a distance corresponding to a deficiency or an excess of a preset distance with respect to an actually travelled distance is displayed.

BRIEF DESCRIPTION OF THE DRAWINGS

These and other objects and features of the present invention will become more readily apparent from the following detailed description of the preferred embodiments taken in conjunction with the accompanying drawings in which:

FIG. 5 shows in block diagram form of a second preferred embodiment of the trip meter according to the present invention.

DETAILED DESCRIPTION OF THE PREFERRED EMBODIMENT

Figure 1:
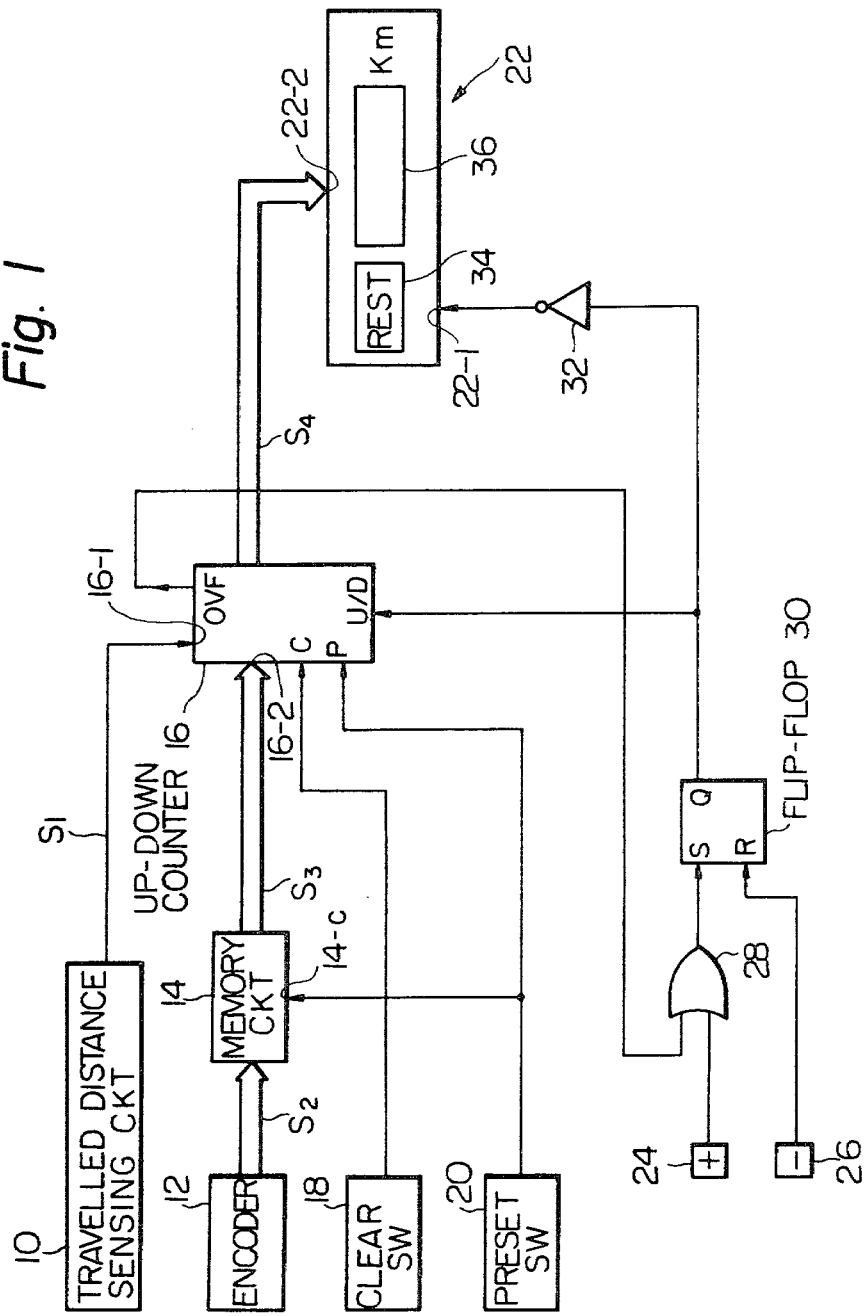
FIG. 1 shows in block diagram form a first preferred embodiment of the trip meter according to the present invention.

FIG. 1 illustrates in block diagram form a first preferred embodiment of the trip meter according to the present invention. The circuitry arrangement of the trip meter includes a travelled distance sensing circuit 10, an encoder 12, a memory circuit 14, an up-down counter 16, a clear switch 18, a preset switch 20, a display circuit 22, an ADD switch 24, a SUBTRACT switch 26, an OR gate 28, a flip-flop 30, and a NOT gate 32.

The travelled distance sensing circuit 10 consists of a pulse generator which generates a pulse each time the vehicle travels over a predetermined distance. The pulse generator (not shown) is operatively connected to a drive shaft of the transmission (not shown) or to the odometer (not shown) of the vehicle. The output of the travelled distance sensing circuit 10 is connected to an input 16-1 of the up-down counter 16 for supplying the pulse train signal $S_1$. If desired, a suitable pulse shaping circuit, such as a schmitt triger circuit may be interposed between the travelled distance circuit 10 and the input 16-1 of the up-down counter 16.

The encoder 12 consists of a keyboard and a decimal binary converter such as a BCD (binary-coded decimal) circuit (not shown). The outputs of the encoder are connected to inputs of the memory circuit 14 where the connection therebetween is shown by a wide directed line since a plurality of conducters are in fact provided. The outputs of the memory circuit 14 are connected in the same manner to a second input 16-2 of the up-down counter 16. The encoder 12 is utilized for writing a known distance, which may be obtained from a suitable map, of a leg that the driver of the vehicle is going to travel, into the memory circuit 14. The memory circuit 14 has a plurality of addresses so that a plurality of information represented by the encoder output signals $S_2$ can be written therein. The vehicle driver operates the keyboard of the encoder 12 to set at least one known distance before he starts from a starting point.

The clear switch 18 and the preset switch 20 are respectively of a manual type and are arranged to produce an output pulse signal when operated. The outputs of the clear switch 18 and the preset switch 20 are respectively connected to a clear terminal "C" and a preset terminal "P" of the up-down counter 16. The output of the preset switch 20 is further connected to a control terminal 14-C of the memory circuit 14. The write-in and read-out function of the memory circuit 14 is controlled by a signal applied to the control terminal 14-C from the preset switch 20. The up-down counter 16 is of a presettable type and is arranged to preset a distance fed from the memory circuit 14 upon presence of a preset switch 20 output signal.

The ADD switch 24 and the SUBTRACT switch 26 are respectively of a manual type and are arranged to produce an output pulse signal when operated. The output of the ADD switch 24 is connected to a first input of the OR gate 28, while the output of the SUBTRACT switch 26 is connected to a reset terminal "R" of the flip-flop 30. The second input of the OR gate 28 is connected to an overflow terminal "OVF" of the up-down counter 16 for receiving an overflow signal therefrom. The output of the OR gate 28 is connected to a set terminal "S" of the flip-flop 30. The output "Q" of the flip-flop 30 is connected to an up-down control terminal U/D of the up-down counter 16 and to an input of the NOT gate 32 the output of which is connected to a first input 22-1 of the display circuit 22. A second input 22-2 of the display circuit 22 is connected to an output of the up-down counter 16 for receiving the output signal $S_4$ of the up-down counter 16.

The display circuit 22 includes first and second display portions 34 and 36. The second display portion 36 is responsive to the signal from the up-down counter 16 for displaying a distance in the form of numerals, while the first display portion 34 is responsive to a signal applied from the NOT gate 32 for displaiying a sign "REST" which indicates that the displayed numeral is a remaining distance to an objective point rather than a distance travelled by the vehicle. The "REST" sign is therefor is arranged to be displayed only when a signal is fed to the first input 22-1 of the display circuit 22.

Figure 2:
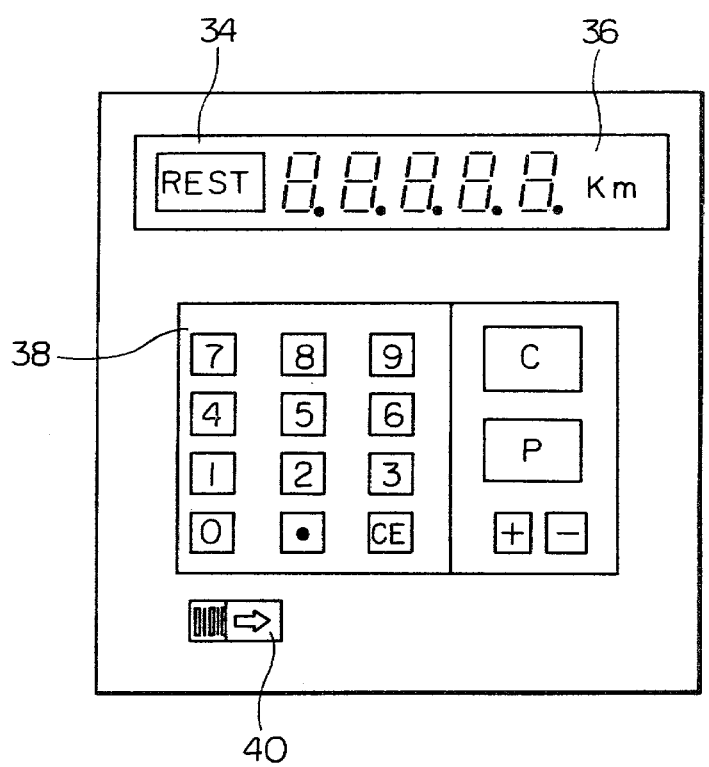
FIG. 2 shows a schematic view of a front elevation of an operating set of the trip meter shown in FIG. 1.

FIG. 2 illustrates a front elevation of an operating set utilized in the first preferred embodiment shown in FIG. 1. The operating set consists of the first and second display portions 34 and 36, a keyboard panel 38, and a key lock switch 40. The key board panel 38 includes ten keys 0, 1, 2, 3, 4, 5, 6, 7, 8 and 9, a decimal key ".", a clear key "C", a clear error key "CE", a preset key "P", an ADD key +, and a SUBTRACT key —. The ten keys 0 to 9 and the decimal key "." are used for encoding a distance, which is already known before starting, of a leg of a travelling course. The clear error key "CE" is used for cancelling erroneous signals produced by misoperation of the ten keys and the decimal key.

The clear key "C" and the preset key "P" respectively correspond to the clear switch 18 and the preset switch 20 shown in FIG. 1, while the ADD key + and the SUBTRACT key — respectively correspond to the ADD switch 24 and the SUBTRACT switch 26 also shown in FIG. 1.

The key lock swtich 40 disposed at the lower position of the front panel of the operation set is utilized for disconnecting various keys of the keyboard 38 from the corresponding circuit. Therefore, when the key lock switch 40 is turned on, operations of the keys of the keyboard 38 do not influence the trip meter at all so that an undesirable operation of the trip meter due to a careless touch of the keys is prevented.

The second display portion 36 includes a plurality of numeral display elements such as light emitting diodes or liquid crystals. A symbol of "Km" is placed at the right most portion of the second display portion 36 for indicating that the numerals shown have a unit of Km. It is preferable to display the numerals as far as the first or second decimal place so that the distance is accurately obtained.

The operating set of the trip meter is preferably mounted on the instrument panel of the vehicle so that the vehicle driver can readily operate the keys on the keyboard 38 and see the first and second display portions 34 and 36.

The operations and the functions of the trip meter shown in FIG. 1 will be described in connection with charts shown in FIG. 3 and FIG. 4.

Figure 3:
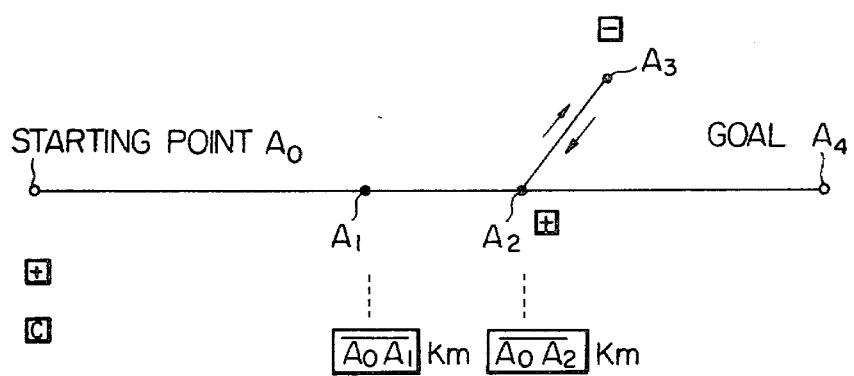
FIG. 3 and FIG. 4 respectively show charts of a travelling course which are convenient for the explanation of the operation of the trip meter.

FIG. 3 illustrates a chart which shows a travelling course. It is assumed that the vehicle starts from a starting point $A_0$ toward an objective point or a goal $A_4$. When the driver of the vehicle wishes to ascertain a distance which will be travelled by the vehicle from the starting point $A_0$ on the way to the goal $A_4$, the driver operates the clear key "C" which corresponds to the clear switch 18 and the ADD key + which corresponds to the ADD switch 24 at the starting point $A_0$. When the clear switch 18 is operated, a pulse signal is applied to the clear terminal "C" of the up-down counter 16 for clearing or cancelling any numbers if stored therein. When the ADD switch 24 is operated, a pulse signal is applied via the OR gate 28 to the set terminal "S" of the flip-flop 30 so that the flip-flop 30 produces a logic "1" signal at the output "Q" thereof. Upon presence of the logic "1" signal the up-down counter 16 is arranged to function as an up counter. Meanwhile the logic "1" signal from the flip-flop 30 output is inverted to a logic "0" signal which is then fed to the first input 22-1 of the display circuit 22. The "REST" sign therefore, is not displayed. Since the up-down counter 16 functions as an up counter, the up-down counter 16 produces an output signal $S_4$ by counting up the number of the pulses, included in the input signal $S_1$, from zero so that the output signal $S_4$ is indicative of a distance travelled by the vehicle. The output signal $S_4$ is fed to the display circuit 22 for displaying the travelled distance at the second display portion 36.

As shown in FIG. 3, at a point $A_1$ the distance between the starting point $A_0$ and the point $A_1$ is displayed. It is assumed that the vehicle has taken a wrong course after the vehicle had passed a second point $A_2$. The vehicle driver does not notice that he is on a wrong course until the vehicle reaches a third point $A_3$. At this time, the second display portion 36 of the display circuit 22 indicates a distance between the starting point $A_0$ and the third point $A_3$, i.e. $\overline{A_0A_2} + \overline{A_2A_3}$. At the third point $A_3$ the driver realized that he is on a wrong way and he decides to return to the second point $A_2$. At this time, viz. at the third point $A_3$, the vehicle driver operates the SUBTRACT switch 26. When the SUBTRACT switch 26 is operated, a signal is fed to the reset terminal "R" of the flip-flop 30 and thus the flip-flop 30 output signal becomes logic "0". Upon presence of the logic "0" signal the up-down counter 16 starts functioning as a down counter. The vehicle returns from the third point $A_3$ to the second point $A_2$ so that the distance indicated by the up-down counter output signal $S_4$ decreases as much as the distance between the second and third points $A_2$ and $A_3$. The distance represented by the signal $S_4$ is expressed by the following equation:

$$\overline{A_0A_2} + \overline{A_2A_3} - \overline{A_3A_2} = \overline{A_0A_2}$$

With this operation the signal $S_4$ indicates the distance between the starting point $A_0$ and the second point $A_2$ when the vehicle arrives at the second point $A_2$ again. At the second point $A_2$ before the vehicle leaves for the goal $A_4$, the vehicle driver operates the ADD switch 24 so that the up-down counter 16 starts functioning as an up counter again. Consequently, the signal $S_4$ is the indication of the distance travelled from the starting point $A_0$ in which the distance does not include the distance travelled between the second point $A_2$ and third point $A_3$. Symbols such as $\boxed{+}$ and $\boxed{C}$ in FIG. 3 indicate each operation of the keys while symbols such as $\overline{A_0A_1}$ indicate distances displayed at the second display portion 36 of the display circuit 22.

It will be understood from the foregoing description, that the trip meter according to the present invention accurately displays a distance travelled along a predetermined course even though the vehicle takes a wrong course on the way to the goal $A_4$ since the distances travelled over a wrong course are offset each other.

Moreover, if the vehicle driver wishes to measure a distance travelled after the vehicle passed a point along the course, such as the point $A_1$, the driver operates the clear switch 18 for resetting the distance indicated by the output signal $S_4$ of the up-down counter 16 to zero. Assuming that the clear switch 18 is operated at the point $A_1$, the numerals displayed at the second display portion 36 become zero and the up-down counter 16 counts up the number of pulses of the signal $S_1$ from zero again for indicating a distance travelled from the point $A_1$. In the same manner the measured distance of a travel may be cancelled whenever the vehicle driver wishes to do so.

In the above, an operation for indicating a distance travelled by the vehicle is described. If the vehicle driver wishes to ascertain a remaining distance to an objective point or a goal of a predetermined course on the way rather than a distance actually travelled, the trip meter may be used for obtaining the remaining distance when used as described hereinbelow in connection with FIG. 4.

Figure 4:
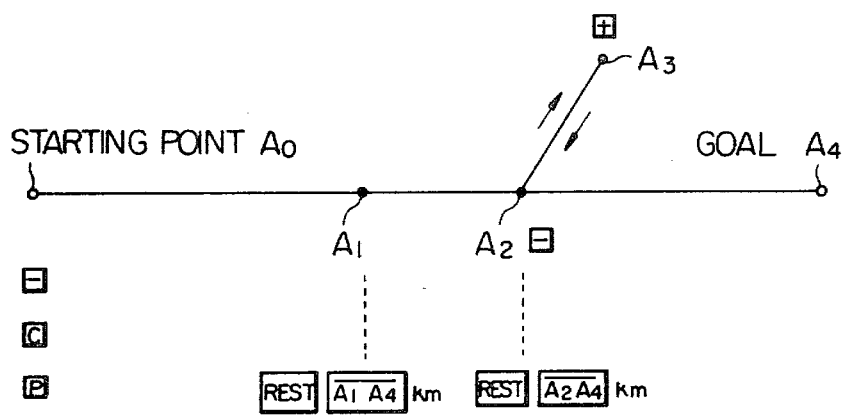

FIG. 4 shows a chart of a travelling course in the same manner as FIG. 3 in which same points are designated by the same references. Before departing from the starting point $A_0$ the vehicle driver operates the clear switch 18 for clearing a preset value of the up-down counter 16. Then the driver writes a distance of a leg or a course that he is going to travel, in the memory circuit 14 by operating the keys on the keyboard 38. If the vehicle driver is aware of a plurality of distances of legs along a course, the plurality of distances may be written into the memory, i.e. respectively into a different addressed memory included in the memory circuit 14.

It is assumed that a distance obtained by a map or the like between the starting point $A_0$ and the goal $A_4$ is expressed by a reference $D_p$. It is to be noted that this distance $D_p$ is not necessarily correct. In other words, the distance $D_p$ might be longer or shorter than the actual distance between the starting point $A_0$ and the goal $A_4$. At the starting point $A_0$ the vehicle driver operates the preset switch 20 and the SUBTRACT switch 26 so that the distance $D_p$ stored in the memory circuit 14 is preset in the up-down counter 16 and thus the up-down counter 16 starts functioning as a downcounter. Further, the sign of "REST" at the first display portion 34 is displayed for indicating that the numerals shown at the second display portion 36 is of a remaining distance to the goal $A_4$. When all of these operations are carried out, the second display portion 36 displays the preset distance $D_p$ when the vehicle is at the starting point $A_0$.

As the vehicle leaves from the starting point $A_0$ the up-down counter 16 counts down the number of pulses, applied to the first input 16-1 thereof, from a value corresponding to the preset distance $D_p$. Therefore, the output signal $S_4$ of the up-down counter 16 indicates a distance obtained by subtracting a distance actually travelled from the preset distance $D_p$. At a point $A_1$ along the course the first and second display portions 34 and 36 respectively display the "REST" sign and a remaining distance, i.e. a distance between the point $A_1$ and the goal $A_4$ expressed by $\overline{A_1A_4}$.

It is further assumed that the vehicle has taken a wrong course after the vehicle had passed a second point $A_2$. In this case, the vehicle driver operates the ADD switch 24 at the third point $A_3$ from which he returns to the second point $A_2$. Since the travelled distances from the second point $A_2$ to the third point $A_3$ and from the third point $A_3$ to the second point $A_2$ offset each other, the up-down counter output signal $S_4$ is indicative of a distance between the second point $A_2$ and the goal $A_4$ so that the remaining distance is displayed as shown in FIG. 4.

The remaining distance decreases as the vehicle approaches the goal $A_4$ and becomes zero at the goal $A_4$ if the preset distance $D_p$ is exactly the same as the actual distance between the starting point $A_0$ and the goal $A_4$.

If the preset distance $D_p$ is correct and the vehicle keeps travelling beyond the goal $A_4$, the signal $S_4$ indicates a distance travelled from the goal $A_4$. In case the vehicle driver wishes to obtain a distance travelled from the starting point $A_0$ beyond the goal $A_4$, the driver presets the distance $D_p$ again in the up-down counter 16 and to operate the ADD switch 24 for switching the up-down counter 16 into the counting up function. With these operation the output signal $S_4$ of the up-down counter 16 indicates a distance travelled from the starting point $A_0$ to a point where the vehicle is.

However, as mentioned before, the preset distance $D_1$ may be erroneous. When the preset distance $Dp$ is longer than the actual distance which is expressed in terms of $Da$, a distance which corresponds to the difference therebetween, viz., $Da-Dp$, is displayed at the second display portion 36 as the remaining distance when the vehicle reaches the goal $A_4$ even though there is no remaining distance in fact. In case that the preset distance $Dp$ is shorter than the actual distance $Da$, a remaining distance represented by the up-down counter output signal $S_4$ becomes zero at a point B in front of the goal $A_4$. When the distance represented by the output signal $S_4$ becomes negative crossing zero value, an overflow signal is produced at the overflow output terminal "OVF" of the up-down counter 16. This overflow signal is fed via the OR gate 28 to the set terminal "S" of the flip-flop 30 to triggering the same. Upon presence of the overflow signal, therefore, the up-down counter 16 is switched to the up counter function from the down counter function. At the same time the "REST" sign fades out. The up-down counter 16 counts up the number of pulses included in the signal $S_1$ after the vehicle passes the point B from zero so that the output signal $S_4$ is an indication of a distance travelled after the vehicle passes the point B. When the vehicle reaches the goal $A_4$, the vehicle driver will ascertain the distance between the point B and the goal $A_4$ since this distance is displayed at the second display portion 36.

In the above mentioned both cases, i.e. the preset distance $Dp$ is either longer or shorter than the actual distance $Da$, the vehicle driver is able to know how much the preset distance $Dp$ is erroneous with respect to the actual distance $Da$. Therefore, the actual distance $Da$ is readily obtained by adding a distance corresponding to the deficiency or by subtracting a distance corresponding to the excess to or from the preset distance $Dp$. The actual distance $Da$ between the starting point $A_0$ and the goal $A_4$ may be used for a return trip if the vehicle retuns to the starting point $A_0$ from the goal $A_4$ by taking the same course. For effectively using the actual distance $Da$ for the return trip, the actual distance $Da$ may be preset in the up-down counter 16 before departing from the goal $A_4$ so that an accurate remaining distance to the original starting point $A_0$ is obtained on the way coming back to the starting point $A_0$.

Reference is now made to FIG. 5 which shows in block diagram form a second preferred embodiment of the trip meter according to the present invention. The circuit arrangement shown in FIG. 5 is similar to that in construction of the first embodiment except that a digital comparator 42 and an alarm 44 are additionally provided. The output of the memory circuit 14 is connected to a first input 42-1 of the digital comparator 42, while the output of the up-down counter 16 is connected to a second input 42-2 of the same. The output of the digital comparator 42 is connected to an input of an alarm, such as a buzzer or a lamp.

The digital comparator 42 is arranged to compare two distances respectively represented by the signal $S_3$ and $S_4$ and to produce an output signal when a distance indicated by the up-down counter output signal $S_4$ exceeds another distance, i.e. the aforementioned preset distance $Dp$, indicated by the memory output signal $S_3$. Upon presence of the output signal of the digital comparator 42, the alarm 44 produces an alarm signal in the form of either a sound or illumination.

In the first embodiment when the trip meter is used for indicating the distance actually travelled, it is meaningless to preset a distance into the up-down counter since a distance preset in the up-down counter 16 should be cleared before counting up the number of the pulses of the signal $S_1$. However, in this second embodiment the signal $S_3$ is fed to the first input of the digital comparator 42 so that a distance stored in the memory 14 is preset in the digital comparator 42 and this preset value is not cleared although the clear switch 18 is operated. When the up-down counter 16 functions as an up-counter from the starting point $A_0$ for producing the output signal $S_4$ indicative of the distance actually travelled, the digital comparator 42 produces an output signal when the distance travelled exceeds the preset distance $Dp$ so that the alarm 44 is energized. With this provision, the vehicle driver may easily ascertain the fact that the vehicle has travelled over the present distance $Dp$. It will be understood that when the vehicle reaches the goal $A_4$ shown in FIG. 3, the alarm 44 issues an alarm signal if the preset distance $Dp$ between the starting point $A_0$ and the goal $A_4$ is correct.

In the above described embodiment the function of the trip meter is described in connection with a single preset distance. However, a plurality of distances of legs of a travelling course may be stored in the memory circuit 14 and each of the distances stored in the memory circuit 14 is presetable into the up-down counter 16 and to the digital comparator 42 in turn by operating the preset switch 20.

The preferred embodiments of the trip meter are constructed by discrete elements as shown in FIG. 1 and FIG. 5. However, if desired, the trip meter according to the present invention may be substituted by a micro computer. It is therefore, understood by those skilled in the art that the foregoing description are preferred embodiments of the disclosed trip meter and that various changes and modifications may be made in the invention without departing from the spirit and scope thereof.

What is claimed is:

1. An electronic trip meter for a motor vehicle, comprising:
   (a) first means for producing a pulse signal each time said vehicle travels over a predetermined unit distance;
   (b) second means for counting up or down the number of pulses applied from said first means, said second means producing an output signal indicative of a distance travelled by said vehicle when counting up said number of pulses from zero, said second means producing an output signal indicative of a remaining distance to an objective point when counting down said number of pulses from a preset value corresponding to a preset distance;
   (c) third means for presetting said distance in said second means;
   (d) fourth means responsive to manual switch means for producing an up-down control signal, said up-down control signal being fed to said second means for controlling the counting up and counting down functions thereof;
   (e) fifth means for displaying a distance represented by the output signal of said second means; and
   (f) sixth means for producing a signal indicating that the remaining distance equals zero, said signal being fed to said fourth means for producing said up-down control signal.

2. An electronic trip meter as claimed in claim 1, wherein said second means comprises a presettable up-down counter.

3. An electronic trip meter as claimed in claim 1, wherein said third means comprises an encoder for encoding at least one distance into a binary signal, a memory circuit responsive to said encoder output binary signal for storing the same, and a preset switch for producing a memory control signal, said memory control signal being fed to said memory circuit for controlling write-in and read out functions, the output of said memory circuit being connected to said second means for presetting one of signals stored in said second means.

4. An electronic trip meter as claimed in claim 3, wherein said memory circuit comprises a plurality of addressed memories for storing a plurality of distances.

5. An electronic trip meter as claimed in claim 1, wherein said fourth means comprises a first manual switch for producing an output signal, a second manual switch for producing an output signal, an OR gate responsive to the output signal of said first switch and to said signal indicating that the remaining distance is below zero, and binary circuit responsive to the output signal of said OR gate and the output signal of said second switch.

6. An electronic trip meter as claimed in claim 1, further comprising second display means responsive to the output signal of said fourth means, said second display means displaying a sign which indicates that the distance displayed by said fifth means is of a remaining distance to a goal of a predetermined course.

7. An electronic trip meter as claimed in claim 1, further comprising means for comparing a distance originally preset in said second means with another distance indicated by the output signal of said second means, and means for producing an alarm signal in response to the output signal of said comparing means.

8. An electronic trip meter as claimed in claim 1, further comprising means for clearing signals stored in said second means.

9. A trip meter for a motor vehicle, comprising:
(a) first means for producing electrical pulses indicative of the distance being travelled by the motor vehicle;
(b) second means coupled with said first means for counting-up the number of said electrical pulses from zero when it performs a counting up function, said second means being operative for counting-down the number of said electrical pulses from a presettable value indicative of a presettable distance;
(c) third means coupled with said second means for setting said presettable value;
(d) fourth means coupled with said second means for providing an up-down control signal to render said second means to perform one of said counting up and counting down functions;
(e) fifth means coupled with said second means and said fourth means for causing said fourth means to render said second means to switch from said counting down function to said counting up function when said second means has counted down to zero; and
(f) a display circuit coupled with said second means.

10. A trip meter as claimed in claim 9, wherein said second means comprises a presettable up-down counter having an overflow terminal by means of which said fifth means is coupled with said second means.

11. A trip meter as claimed in claim 10, wherein said fourth means comprises a flip-flop having a set terminal, a reset terminal and an output terminal by means of which said up-down counter is coupled with said flip-flop, and wherein said fourth means further comprises a first manual switch coupled with said set terminal of said flip-flop via an OR gate, and a second manual switch coupled with said reset terminal of said flip-flop.

12. A trip meter as claimed in claim 11, wherein said up-down counter includes an up-down control terminal coupled with said output terminal of said flip-flop.

13. A trip meter as claimed in claim 12, wherein said fifth means comprises said OR gate having a first input terminal thereof coupled with said first manual switch, a second input terminal thereof coupled with said overflow terminal of said up-down counter, and an output terminal thereof coupled with said set terminal of said flip-flop.

14. A trip meter as claimed in claim 13, wherein said display circuit comprises a first display portion coupled with said output terminal of said flip-flop via a NOT gate, and a second display portion coupled with said up-down counter.

15. A trip meter as claimed in claim 14, wherein said third means comprises an encoder, a memory circuit coupled with said encoder, and a preset switch coupled with said memory circuit to control write-in and read-out functions of said memory circuit, said preset switch being coupled with a preset terminal of said up-down counter, said memory circuit being coupled with said up-down counter for setting said presettable value upon presence of an output from said preset switch.

16. A trip meter as claimed in claim 15, further comprising a comparator having an input connected to an output of said memory circuit and another input connected to an output of said up-down counter, and an alarm having an input connected to an output of said comparator.

* * * * *